Figure 1:
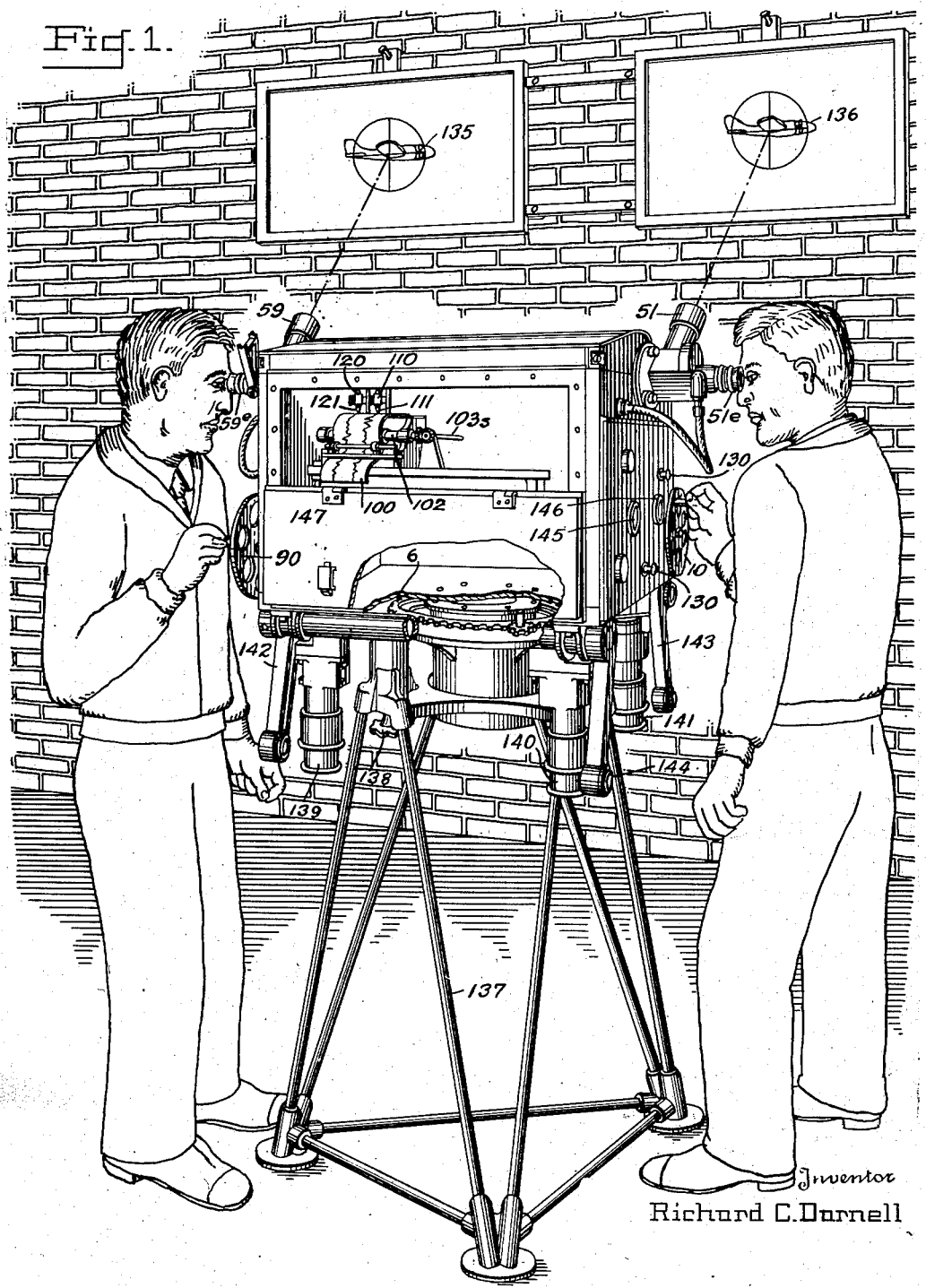

Oct. 30, 1945.  R. C. DARNELL  2,387,749
DIRECTOR TRAINER
Filed June 23, 1944  2 Sheets-Sheet 1

Inventor
Richard C. Darnell
By C. E. Herristrom & W. E. Thibodeau
Attorneys

Oct. 30, 1945. R. C. DARNELL 2,387,749
DIRECTOR TRAINER
Filed June 23, 1944 2 Sheets-Sheet 2

Inventor
Richard C. Darnell
By C. E. Herrstrom & W. E. Thibodeau
Attorneys

Patented Oct. 30, 1945

2,387,749

UNITED STATES PATENT OFFICE 2,387,749

DIRECTOR TRAINER

Richard C. Darnell, Champaign, Ill.

Application June 23, 1944, Serial No. 541,804

17 Claims. (Cl. 35—25)

(Granted under the act of March 3, 1883, as amended April 30, 1928; 370 O. G. 757)

The invention described herein may be manufactured and used by or for the Government for governmental purposes without the payment to me of any royalty thereon.

This invention relates to a "director trainer," which is an apparatus for training personnel in the operation of directors and similar fire-control equipment employed in tracking targets. The director to which the present invention pertains is more particularly a director for training men in tracking an aerial target.

One of the objects of the invention is to provide a director trainer which will be adapted for indoor use, so that it may be independent of daylight and weather conditions and hence may be in use for the full twenty-four hours; furthermore, the indoor use of the director trainer eliminates the necessity of using a live aerial target and live ammunition. Another object of invention is to provide a director trainer which will furnish a visible and permanent record of the trainee's ability to keep the instrument on the target. Still another object is to provide a director trainer which will be substantially the same, in both appearance and tracking operation, as the director used in actual combat operations, so that trainees may easily transfer from the director trainer to the combat director with the minimum change of operational technique.

The director commonly used in tracking aerial targets is manned by two men; one is the azimuth tracker whose duty is to sight the target through the azimuth tracker's telescope and track it by manipulating the azimuth tracker's handwheel to turn the entire director (including the elevation tracker's instrumentalities) in azimuth about a fixed vertical axis. The duty of the elevation tracker is to sight the target through the elevation tracker's telescope and to track it by manipulating the elevation tracker's handwheel. A further object of this invention is to provide a director trainer for training, either simultaneously or separately, both the azimuth and elevation trackers in the art of tracking aerial targets, and for maintaining separate records for both the azimuth and elevation trackers.

The director commonly used in tracking aerial targets employs three methods of tracking, viz., "direct," "rate" and "aided" tracking. In "direct tracking" the angular movement of the tracking telescope is directly proportional to the movement imparted to the tracking control or handwheel. In "rate tracking" the angular movement of the tracking telescope continues at a rate which is dependent upon the particular position to which the tracking control or handwheel had been adjusted. The telescope will continue to move at that rate until the handwheel is re-adjusted. "Aided tracking" is a combination of direct and rate tracking, in which the tracker's handwheel performs two functions, viz., (a) a direct control of the telescope, for direct tracking, and (b) control of the displacement of the ball carriage of a variable speed mechanism, the position of the ball carriage determining the rate of change transmitted to the telescope, for rate tracking. A further object of this invention is to provide a director trainer which embodies the principles of aided tracking but which may be, if desired, made to conform to the principles of direct tracking alone.

Figure 2:
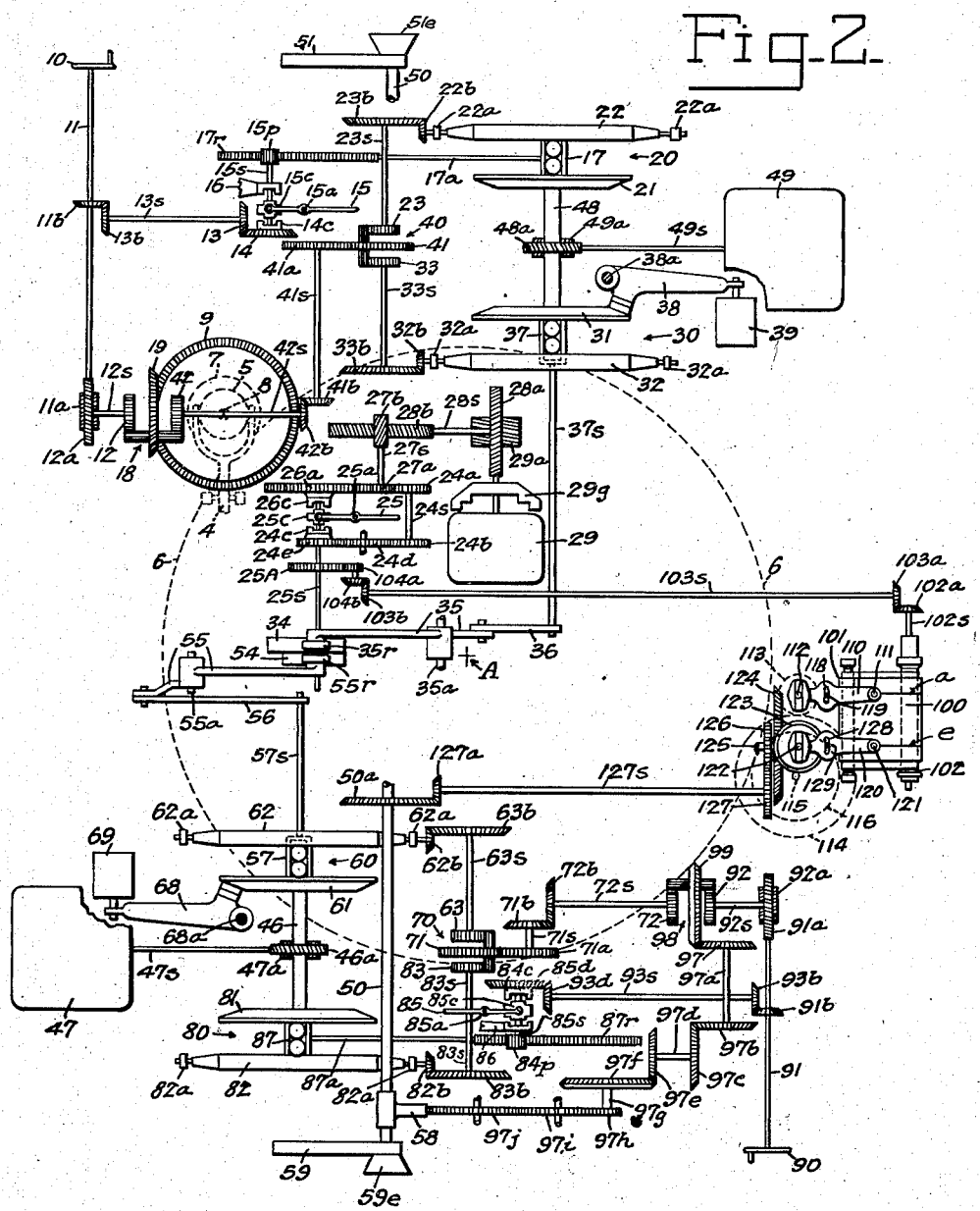

For the attainment of the foregoing and such other objects of invention as may hereinafter appear or be pointed out I have shown an embodiment of my invention in the accompanying drawings, wherein Figure 1 is a perspective view of the apparatus in use, and Figure 2 is a plan view of the working mechanism.

As is known, in the director actually used in range finding and gun laying, the azimuth tracking is effected by rotating the entire mechanism and its housing on a vertical axis turntable at the head of a fixed tripod so as to bring two parallel telescopes carried by the apparatus into proper azimuth bearing with the target. The elevation tracking, however, is achieved by rotating the telescopes on a horizontal axis relatively to the housing. These movements are generally produced by the manual operation of two hand wheels by respective trackers the one of these wheels being at the right hand side of the machine near its front while the other is at the left of the machine near the rear side. In the use of such a director the trackers stand upon the earth or a platform where the tripod is set up, and each applies one eye to the eyepiece of an elbow telescope at his side of the machine while he manipulates the adjacent tracker's wheel.

When exceptionally rapid traverse movement of the director is required to initially sight the target, the machine may be "slewed" independently of the tracker's wheels and gear by operating a slewing lever and then applying manual force directly to the housing or handle elements thereon to approximate a line of sight, after which the tracker's wheels are used.

The principle of the present invention is to largely avoid actual rotative movement of the machine bodily by positioning the apparatus so that its telescopes may be trained simultaneously upon duplicate miniature targets very close to the machine within a room, the images of which in the telescopes correspond to those produced by a single full size target as viewed in a director at usual gun ranges. This permits the use of standard elbow telescopes of directors, notwithstanding that the miniatures are in the same room with the trainer.

To avoid the need for moving the targets a mechanism is introduced into the machine which tends to turn the machine away from proper azimuth and also to turn the telescopes from proper elevational positions, so that in the one instance, the images will tend to be displaced laterally at a rate corresponding to the angular azimuth rate of a target at a given range and moving in a given direction and speed; and the telescopes will likewise tend to be moved so that the images will tend to apparently move in elevation at a rate or in degree equivalent to the angular component of elevation involved by a given direction and speed of target.

By forming each tracker's control wheel as one leg of a differential gearing, the inserted displacing drive as a second leg of such differential and utilizing the third leg as an actual driving means for the rotation of the case or the telescopes as the case may be, the tracker, as soon as he notes displacement of the target image may return the image to correct register with cross hairs in the telescope and prevent further displacement by matching the rate imported at the second leg. By further forming a paper record band having longitudinal straight parallel base lines for azimuth and elevation and connecting the third leg to a scriber engaging the band adjacent one of the lines, then moving the band at a proper rate, the effectiveness of the movements imported by the tracker at his hand wheel may be graphically represented. A line by the scriber to one side or the other of the base line may be calibrated in mils by appropriate coordinates ruled parallel to the base line. This has been successfully practiced with the device shown herein.

In this functioning of the machine there will often be no perceptible actual movement of the housing or the telescopes, especially if the pupils are prompt in perception and motor reflexes. There will not be need for the trainee to change his position, because the target images erected before the trainer will rarely be materially off the line of sight in the telescopes, before the scholars will have compensated for the displacement attempted by the interposed motion, or input, and will fairly closely approximate a matching of the input angle rate.

As stated above, the director trainer is made to resemble, in appearance and operation, the director actually used in combat. As shown in Figure 1, the tripod 137 provides the usual three-point support, each point of support being adjustable vertically by leveling screws, one of which is shown at 138. Actual or simulated spring buffers 139, 140 and 141 may be provided as well as pivoted carrying brackets 142 and 143 having arms apertured at their outer ends as at 144 for receiving the usual porter bars, not shown. Knobs 130 simulate the usual rate setting clutch controls, while openings or windows 145 and 146 may represent the constant speed gear adjustment opening and the zero deflection observation window, respectively, of the actual director which the instrument is built to simulate. Door 147 is shown in open position to expose the tracking error recorder 100, subsequently to be described.

Following the precise location of these parts in the combat director, the azimuth tracker's handwheel 10, as viewed in the plan view of the trainer shown in Fig. 2, is at the upper, left-hand corner, the front of the machine being at the left hand side of the view. Also at the upper location but to the right of the azimuth tracker's handwheel 10 as seen in Fig. 2, is the azimuth tracker's telescope 51, which is in the form of an elbow telescope having eye-piece 51e. The elevation tracker's handwheel 90 and telescope 59 are located along the lower side of the trainer as shown in the drawing, the handwheel being at the lower, right-hand corner, with the telescope 59 to the left thereof. As clearly seen in the drawings, the two telescopes, more particularly their eye-pieces 51e and 59e, are in alignment; that is, the azimuth tracker's telescope 51 and the elevation tracker's telescope 59 are both mounted on a shaft 50 which extends from the upper side of the trainer to the lower side, as shown in the drawings. The two telescopes are mounted on the single shaft 50 so that both are elevated and depressed in unison, by manipulation of the elevation tracker's handwheel 90 (by means more fully described hereinafter). Manipulation of the azimuth tracker's handwheel 10 causes angular traversing or turning of the trainer casing and parts carried thereby about a central vertical axis, point A.

Taking up first the angular turning of the trainer, on vertical axis A, under control of the azimuth tracker's handwheel 10, this handwheel is secured at one end of a shaft 11 extending beyond the casing of the trainer. At the other end of the shaft is secured a worm 11a which meshes with a gear 12a secured at the left end of a short shaft 12s. At the right end of short shaft 12s is secured a gear 12 which constitutes one of the input gears of a differential 18. The output bevel gear 19 of the differential meshes with a bevel gear 9 which is secured at the top of a vertical shaft 8, at the lower end of which is rotatably mounted a pinion gear 7 which meshes with a large gear 6 fixed concentrically of the vertical axis A. Gear 6 is the main azimuth gear upon which the entire trainer and all its parts are carried; hence by rotating it about gear 6 the trainer is turned in azimuth. A clutch collar 5 is splined on the vertical shaft 8 the jaws of which are engageable with complementary jaws provided on the pinion 7. Splined collar 5 may be thrown into and out of engagement with pinion 7 by a manual 4.

With clutch collar 5 engaging pinion 7, direct tracking in azimuth may be imparted to the trainer by turning azimuth tracker's handwheel 10. The direct turning of handwheel shaft 11 is transmitted to the trainer through the differential 18, more particularly, through the differential input gear 12. By throwing clutch collar 5 out of engagement, the entire trainer, may be freely and rapidly turned or "slewed" by hand for preliminary setting or other reasons.

Azimuth tracker's handwheel 10 also imparts rate tracking in azimuth by controlling the displacement of the ball carriage 17 of a variable speed drive 20, as follows: secured on the handwheel shaft 11 is a bevel gear 11b which meshes with a bevel gear 13b secured at the left end of a shaft 13s. At the right end of shaft 13s is secured a bevel gear 13 which meshes with a bevel gear 14 rotatively mounted on a shaft 15s. Bevel gear 14 is provided with clutch jaws 14c which are engageable with complementary jaws of a clutch collar 15c which is splined on the said shaft 15s and manipulated into and out of engagement with the clutch jaws 14c of gear 14 by a lever 15 pivotally mounted at 15a. Clutch collar 15c is further provided with clutch jaws which are engageable, when collar 15c is out of engagement with jaws 14c, with the complementary jaws of a stop member 16. With clutch collar 15c engaged with the clutch jaws 14c of bevel gear 14, the manual turning of the azimuth tracker's handwheel 10 is transmitted to shaft 15s and to a pinion gear 15p secured at the end of shaft 15s, which meshes with a rack 17r connected by a rod 17a to the ball carriage 17. The clutch 15c and its manual 15 are provided for the purpose of disconnecting the drive from the handwheel shaft 11 to the ball carriage 17 of variable speed drive 20, when it is desired that the trainer be operated according to the principles of direct tracking, in which case the azimuth tracker's handwheel 10 drives the trainer directly, through input gear 12 of differential 18.

But when it is desired that the trainer be operated according to the principles of aided tracking, clutch collar 15c is adjusted into engagement with the clutch jaws 14c of gear 14 so that the azimuth tracker's handwheel 10 will control the displacement of the ball carriage 17 of the variable speed drive 20. As explained above, aided tracking is a combination of direct tracking and rate tracking. Hence in aided tracking, the azimuth tracker's handwheel 10 drives the trainer directly (for direct tracking) and controls the displacement of ball carriage 17 (for rate tracking). Variable speed drive 20 is actuated by a constant speed motor 49 which drives, through a shaft 49s and gears 49a and 48a, a shaft 48 to one end of which is secured the friction disc 21 of variable speed drive 20. The balls of ball carriage 17 serve to transmit motion from the constant-speed disc 21 to the driven cylinder 22 which is mounted for rotation between bearings 22a. At one end of driven cylinder 22 is secured a bevel gear 22b which meshes with a bevel gear 23b secured at one end of a shaft 23s. At the other end of shaft 23s is one input gear 23 of a differential 40, the output gear 41 of which meshes with a gear 41a secured at one end of a shaft 41s, at the other end of which is a bevel gear 41b which meshes with a bevel gear 42b secured at the right end of a second shaft 42s. At the left end of shaft 42s is one of the input gears 42 of the differential 18.

If the apparatus were an ordinary director and not a director trainer, the differential 40 would be eliminated entirely so that the output or driven cylinder 22 of the variable speed drive 20 would be connected directly to input gear 42 of the differential 18. The function of differential 40 in the operation of the trainer will be explained shortly. But at this point it should be observed that the input gear 12 of the differential 18 is actuated directly from handwheel 10 for the direct tracking component, while the other input gear 42 of differential 18 is actuated from the driven cylinder 22 of variable speed drive 20 to transmit the rate tracking component. The direct tracking component is combined with the rate tracking component in differential 18, the output gear 19 of which therefore transmits the combined or aided tracking to the pinion 7 which meshes with and moves orbitally about fixed gear 6, in the manner described hereinabove.

The director is transformed into a director trainer by introducing an artificial and automatic variation in the azimuth and elevation mechanism. As mentioned in the statement of invention, the director trainer is especially adapted for indoor use and is trained upon an artificial target, such as a miniature aeroplane. The indoor plane target is not moved to simulate the motions of an aeroplane in flight but is secured permanently in place relatively to the trainer. Instead of moving the target, the lines of sight and the trainer itself are given components movements the result of which requires both azimuth and elevation adjustments in the azimuth tracker's and the elevation tracker's handwheels to keep said lines of sight directed on the stationary target. To simulate movement of the target in azimuth, the trainer casing and parts carried thereby are caused to turn in azimuth about the fixed vertical axis A; to simulate movement of the target in elevation, the two telescopes—i. e., both the elevation tracker's telescope 59 and the azimuth tracker's telescope 51—are raised and lowered in unison on their common shaft 50. The term "target" has been used in the foregoing discussion in the singular; actually, two miniature plane targets 135 and 136 are used, separated a horizontal distance equal to the dimension between the two telescopes 51 and 50, one of them being placed in front of the azimuth tracker's telescope 51 and the other in front of the elevation tracker's telescope 59.

Recurring to the detailed description of the azimuth tracking mechanism, the aforementioned differential 40 is provided so that the said artificial and automatic variation may be introduced into the transmission train leading to the pinion 7 in mesh with fixed gear 6. That is, the differential 40 combines the rate tracking component of the azimuth tracker's control, at the differential input gear 23, and the artificial and automatic variation of the trainer in azimuth. The latter motivation of the trainer is transmitted through differential input gear 33. Gear 33 is secured at one end of a shaft 33s, at the other end of which is secured a bevel gear 33b which meshes with a bevel gear 32b secured at the left end of the driven cylinder 32 of a variable speed drive 30. The cylinder 32 is journaled in bearings 32a at each end.

The constant speed disc 31 of variable speed drive 30 is secured at one end of the shaft 48 referred to above in connection with the variable speed drive 20 of the rate tracking mechanism. It is thus seen that the shaft 48, which is driven by constant speed motor 49 as already described, rotates both the constant speed disc 21 of the rate tracking variable speed drive 20 and the constant speed disc 31 of the trainer variation variable speed drive 30. The balls of ball carriage 37 transmit motion from the constant speed disc 31 to the driven cylinder 32 of variable speed drive 30, which motion is dependent upon the radial position to which the ball carriage is adjusted. By adjusting the position of ball carriage 37, the variable speed drive 30 may be caused to introduce the desired automatic motion to the trainer to simulate a horizontal movement of the target. For this purpose there is provided a cam 34 which is designed to impart the proper adjustments to ball carriage 37 to cause the desired artificial increments of azimuthal angular movement of the trainer. Coacting with cam 34 is a cam follower roller 35 provided at the distal end of the left arm of a lever 35 pivotally mounted at 35a. The distal end of the right arm of lever 35 is connected by a link rod 36 to one end of a member 37s which is mounted for sliding movement left and right of Fig. 2. At the other end of sliding member 37s is secured the ball carriage 37.

A magnetic brake may be provided to stop the rotation of shaft 48 when the motor 49 is turned off. It may be associated with either the rate tracking disc 21 or the azimuth disc 31. As shown in Fig. 2 the magnetic brake 38, pivotally mounted at 38a, coacts with the azimuth variation disc 31 and is actuated by solenoid 39.

The azimuth variation cam 34 is secured on a shaft 25s to which is splined a clutch collar 25c which is engageable either with jaw collars 26c affixed to a gear 26a or with jaw collars 24c affixed to a gear 24e. Both the gears 26a and 24e are rotatively mounted on shaft 25s; gear 26a is designed to rotate shaft 25s at low speed while gear 24e is designed to rotate it at high speed. Low speed gear 26a is driven from a constant speed motor 29 through gear 27a, shaft 27s, gears 27b and 28b, shaft 28s, and gears 28a and 29a, the latter gear being secured on the motor shaft with which is associated a speed governor 29g. A lever 25 pivotally mounted at 25a is provided to shift clutch collar 25c into engagement with low gear jaws 26c or high gear jaws 24c. The speed-up drive to high speed gear 24e includes a gear 24a meshing with the gear 27a, shaft 24s and the train of gears 24b, 24d and 24e. By the provision of low speed gear 26a and high speed gear 24e, azimuth cam 34, which is driven by shaft 25s as explained, is enabled to vary the ball carriage 37 of the variable speed drive 30 at either a reduced rate, to introduce azimuth motion of a low speed target, or at an enhanced rate, to introduce azimuth motion of a high speed target.

In addition to the azimuth cam 34 the shaft 25s also mounts an elevation cam 54 with which coacts follower roller 55r at the distal end of the right arm of a lever 55 of the first order pivotally mounted at 55a. The distal end of the left arm of lever 55 is connected by link rod 56 to a sliding member 57s at the other end of which is secured a ball carriage 57 of a variable speed drive 60. The balls of ball carriage 57 transmit motion from constant speed disc 61 to the driven cylinder 62 which is journaled in end bearings 62a. Secured at the right end of driven cylinder 62 is a bevel gear 62b which meshes with a gear 63b at one end of a shaft 63s, at the other end of which is secured a spur gear 63 which constitutes one of the input gears of a differential 70. The output gear 71 of differential 70 is connected through gear 71a, shaft 71s, bevel gears 71b and 72b and shaft 72s, to the input gear 72 of a second differential 98. The output gear 99 of differential 98 is connected to the telescope shaft 50 through the following train: bevel gear 97, shaft 97a, bevel gears 97b and 97c, shaft 97d, bevel gears 97e and 97f, shaft 97g, and spur gears 97h, 97i and 97j. Final spur gear 97j meshes with a segment gear 58 secured on telescope shaft 50. In this manner the output gear 99 of differential 98 is effective to rotate the telescope shaft 50 and the elevation tracker's telescope 59 and the azimuth tracker's telescope 51 mounted on shaft 50.

The variable speed drive 60, described above, functions to introduce the artificial and automatic variation in the elevation motion of the lines of sight; the elevation variation variable-speed drive 60 is thus the counterpart of the azimuth variation variable-speed drive 30. The constant speed disc 61 of the elevation variable-speed drive 60 is secured at one end of a shaft 46 which is driven from constant speed motor 47 through motor shaft 47s and gears 47a and 46a. A magnetic brake arm 68 pivotally mounted at 68a is associated with disc 61 and is actuated by solenoid 69. Under control of the elevation variation cam 54, which adjusts the position of ball carriage 57 in accordance with the desired changes in rate of variation in elevation, variable speed drive 60 causes telescope shaft 50 to angularly elevate or depress the telescopes to simulate the target variation in elevation. As outlined above, the transmission from variable speed drive 60 to the telescope shaft 50 includes differential 70 and differential 98.

Differential 70, which is the counterpart of differential 40 previously considered in connection with the azimuth instrumentalities, functions to combine the artificial elevation variation and the elevation rate tracking component. The elevation variation has already been described; it is transmitted by the input gear 63 of differential 70. The elevation rate tracking component is transmitted by input gear 83 of differential 70. Input gear 83 is secured at one end of a shaft 83s, at the other end of which is secured a bevel gear 83b which meshes with a bevel gear 82b secured at the right end of the output or driven cylinder 82 of a variable speed drive 80. Driven cylinder 82 is journaled in end bearings 82a. Variable speed drive 80 is thus the counterpart of variable speed drive 20 of the azimuth instrumentalities, both being used in connection with the rate tracking component. The constant speed disc 81 of variable speed drive 80 is secured on the shaft 46 and is driven, together with the constant speed disc 61 of variable speed drive 60, by motor 47. Ball carriage 87 transmits motion from the constant speed disc 81 to the driven cylinder 82 and is adjusted by means of rod 87a to which it is secured and a rack 87r at the end of rod 87a. Meshing with rack 87r is a pinion 84p fixedly mounted on a shaft 85s. Clutch collar 85c is splined upon shaft 85s and may be adjusted to engage pinion clutch 84c by a hand lever 85 pivotally mounted at 85a. Journaled upon the shaft 85s is a bevel gear 85d in mesh with a bevel gear 93d secured at the left end of a shaft 93s at the right end of which is secured another bevel gear 93b meshing with a bevel gear 91b secured on handwheel shaft 91. When clutch collar 85c is in position toward pinion 85p, it engages a correspondingly-shaped stop or locking element 86. In this position, gear 85d is free to rotate relatively to shaft 85s and said shaft and pinion 84p are locked. With the clutch collar 85c shifted to engage clutch 84c, manipulation of the elevation tracker's handwheel 90 will adjust the position of the ball carriage 87 of the rate tracking variable speed device 80. The clutch 85c is provided in order that the rate tracking component may be cut out by disengaging the clutch from part 84c.

Differential 98, which is the counterpart of differential 18 of the azimuth instrumentalities, functions to combine the output of the differential 70 (which, as described, combines the rate tracking component and the artificial elevation variation) with the direct tracking component. The output of differential 70 enters differential 98 at input gear 72. The direct tracking component enters differential 98 at the other input gear 92. Input gear 92 is secured at one end of a shaft 92s which is driven from the handwheel shaft 91 through gears 92a and 91a.

The performance of the azimuth tracker and the elevation tracker is separately recorded on paper strip 100, the azimuth tracker's performance being recorded by stylus holder 110 and the elevation tracker's performance, by stylus holder 120. Azimuth stylus holder 110 is driven from the main azimuth gear 6 through a gear 116 which meshes with main azimuth gear 6. Gear 116 together with a second gear 114 are secured on an upright spindle 115. The said second gear 114 meshes with a pinion 113 which is secured to an upright spindle 112 to which is secured the stylus holder 110. At the distal end of stylus holder 110 is a pencil or pen 111 in contact with paper strip 100. Elevation stylus holder 120 is driven from the telescope shaft 50 through a bevel gear 50a secured on shaft 50 which meshes with a gear 127a secured at the left end of a shaft 127s at the right end of which is secured a spur gear 127 which meshes with gear 126 which is mounted together with a bevel gear 124 on a short horizontal spindle 125. Bevel gear 124 meshes with gear 123 which is secured together with elevation stylus holder 120 on a vertical spindle 122. At the distal end of stylus holder 120 is a pencil or pen 121 in contact with paper strip 100. Azimuth stylus holder 110 and elevation stylus holder 120 are provided with arcuate slots, respectively, 118 and 128 which cooperate with fixed pins 119 and 129 to limit the swing of the stylus holders. Means, such as a fibre washer pressed by a spring washer (not shown), frictionally transmits the drive to the stylus holders and serves as a slip clutch when the holders are prevented from further sweep by the limit pins 119 and 129. The recording paper 100 is advanced from supply roll 101 to take-up roll 102 by a drive connection from the shaft 25s, which shaft has already been described as mounting the azimuth variation cam 34 and the elevation variation cam 54 and as being driven by motor 29. This drive comprises a gear 25A secured on shaft 25s which meshes with a pinion 104a which rotates as a unit with bevel gear 104b; bevel gear 104b meshes with gear 103b secured on the left end of shaft 103s, at the right end of which is secured a bevel gear 103a which meshes with gear 102a secured on paper take-up shaft 102s.

In the operation of the director trainer, the azimuth tracker and the elevation tracker, by manipulation of their respective handwheels 10 and 90, endeavor to maintain their respective telescopes 51 and 59 on the stationary miniature target against the constant tendency of the azimuth variation cam 34 and the elevation variation cam 54 to move these telescopes away from the stationary target. If the trackers are completely able to maintain their telescopes steady on the stationary target despite the variations set into the trainer and the telescope shaft 50 by the variation cams, then the result would be that the trainer and the telescope shaft 50 will not be moved at all from their preliminary setting with the azimuth and elevation telescopes trained on the miniature target. This stationary condition of the trainer and telescope shaft 50 is a consequence of the facts that the manipulation of the azimuth tracker's handwheel 10 will turn the main azimuth gear 6 in direction and extent to completely counteract the turning imparted thereto by the azimuth variation cam 34 while the manipulation of the elevation tracker's handwheel 90 will turn the telescope shaft 50 in direction and extent to completely counteract the turning imparted thereto by the elevation variation cam 54. Inasmuch as neither the main azimuth gear 6 nor the telescope shaft 50 deviates from their preliminary settings if the tracking is 100% perfect, the azimuth stylus holder 110, driven from the main azimuth gear 6, and the elevation stylus holder 120, driven from the telescope shaft 50, will not deviate from their preliminary setting but will continue to follow the respective datum lines on recording paper strip 100 which represent the condition of perfect target tracking. The azimuth datum line is designated $a$ and the elevation datum line $e$ in the drawing.

Inaccuracy or lag in tracking results in deviation of the stylus, azimuth or elevation, away from the respective datum line, $a$ or $e$, and the extent of such deviation is an indication of tracking performance of the student.

The manual 25 is adjusted to rotate cam shaft 25s at high speed or at low speed, depending upon whether it is desired to simulate a high or a low speed target. The manual 15 in the azimuth instrumentalities and the manual 85 in the elevation instrumentalities are adjusted for either aided tracking, by transmitting motion from the handwheel shafts to the ball carriages of the azimuth variable speed drive 20 and the elevation variable speed drive 80 or for direct tracking by cutting out such transmission.

It is understood that the azimuth variation cam 34 and the elevation variation cam 54 are designed so that together they will simulate the actual course of a real target. The cams are interchangeable, in pairs, so as to provide for any desired target course or combination of courses, whether horizontal, diving, climbing, incoming, out-going, etc.

The manuals 15, 25, 85, may be operated by an instructor or other person at shifter devices of conventional construction through knobs such as shown at 130 in Fig. 1 the details thereof being omitted in Fig. 2 to avoid obscuring the essential mechanism.

It should be understood that the purpose in using cams at 34 and 54 is to enable a progressing variation of the input angular rate changes in azimuth and elevation when desired, corresponding to those of a target, for instance, approaching on a crossing course, achieving acceleration from a low rate corresponding to the incoming leg and deceleration simulating the outgoing leg, with a high rate during the intermediate part of the trial corresponding to the motion of a target at the moment of crossing. Cams shaped to fit special target actions may be used alternatively, and manual control of motor speeds are obvious expedients available for the device.

Due to the possibility of uncertainty as to exactly what part of a plane target is most vulnerable, and where the cross hairs of the telescope should lie on the image of the target when the instrument may be said to be "on target," it has been the practice in the use of this machine to superimpose on each target a circle and cross lines intersecting over a proper medial point on the target. An alignment of these crossed target lines with the cross hairs of the telescope thereby marks the exact on target position, when the styluses will engage upon respective datum lines of the record sheet.

I claim:

1. In a director trainer for use with a stationary, miniature aerial target, the combination of an azimuth tracker's handwheel, a fixed azimuth gear having a vertical axis, a pinion meshing with and revoluble about said fixed gear, a variable speed device for introducing variational turning in the said pinion, a variable speed device for supplying the rate change for azimuth rate tracking, a first differential one of the input gears of which is connected to the driven shaft of the said variational azimuth variable speed device and the other of its input gears being connected to the driven shaft of the said azimuth rate tracking variable speed drive, a drive connection between the said azimuth tracker's handwheel and the ball carriage of the said azimuth rate tracking variable speed drive, said connection having clutch means to disconnect the said variable speed drive for direct azimuth tracking, a constant speed motor for driving the constant speed discs of the two said variable speed drives, a second differential one of the input gears of which is connected to the output gear of the first said differential and the other of its input gears being connected to the said azimuth tracker's handwheel, a drive connection between the output gear of the second said differential and the said pinion, said connection having clutch means to disconnect the drive to the pinion for preliminary manual turning, means including an azimuth variation cam for automatically varying the ball carriage of the said variational azimuth variable speed device, a shaft, an azimuth tracker's and an elevation tracker's telescope mounted on the said shaft, an elevation tracker's handwheel, a variable speed device for introducing variational turning in the said telescope shaft, a variable speed device for supplying the rate for elevation rate tracking, a third differential one of the input gears of which is connected to the driven shaft of the said variational elevation variable speed device and the other of its input gears being connected to the driven shaft of the said elevation rate tracking variable speed drive, a drive connection between the said elevation tracker's handwheel and the ball carriage of the said elevation rate tracking variable speed drive, said connection having clutch means to disconnect the said variable speed drive for direct elevation tracking, a constant speed motor for driving the constant speed discs of the two said variable speed drives, a fourth differential one of the input gears of which is connected to the output gear of the said third differential and the other of its input gears being connected to the said elevation tracker's handwheel, a drive connection between the output gear of the said fourth differential and the said telescope shaft, means including an elevation variation cam for automatically varying the ball carriage of the said variational elevation variable speed device, a common shaft mounting the said azimuth variation cam and the said elevation variation cam, a constant speed motor connected to the said cam shaft, said connection including means for varying the speed of the cam shaft, a recording device comprising paper driving means connected to the said cam shaft, and a pair of stylus markers, one of the said stylus markers being connected to the said azimuth gear to record azimuth turning of the said azimuth telescope and the other of the said stylus markers being connected to the said telescope shaft to record elevation turning of the said elevation telescope.

2. In a direction trainer for use with a stationary, miniature aerial target, the combination of an azimuth tracker's handwheel, a fixed azimuth gear having a vertical axis, a pinion meshing with and revoluble about said fixed gear, a variable speed device for introducing variational turning in said pinion, a variable speed device for supplying the rate change for azimuth rate tracking, a first differential one of the input gears of which is connected to the driven shaft of the said variational azimuth variable speed device and the other of its input gears being connected to the driven shaft of the said azimuth rate tracking variable speed drive, a drive connection between the said azimuth tracker's handwheel and the ball carriage of the said azimuth rate tracking variable speed drive, said connection having clutch means to disconnect the said variable speed drive for direct azimuth tracking, a constant speed motor for driving the constant speed discs of the two said variable speed drives, a second differential one of the input gears of which is connected to the output gear of the first said differential and the other of its input gears being connected to the said azimuth tracker's handwheel, a drive connection between the output gear of the second said differential and said pinion, said connection having clutch means to disconnect the drive to the pinion for preliminary manual turning, means including an azimuth variation cam for automatically varying the ball carriage of the said variational azimuth variable speed device, a shaft, an azimuth tracker's and an elevation tracker's telescope mounted on the said shaft, an elevation tracker's handwheel, a variable speed device for introducing variational turning in the said telescope shaft, a variable speed device for supplying the rate for elevation rate tracking, a third differential one of the input gears of which is connected to the driven shaft of the said variational elevation variable speed device and the other of its input gears being connected to the driven shaft of the said elevation rate tracking variable speed drive, a drive connection between the said elevation tracker's handwheel and the ball carriage of the said elevation rate tracking variable speed drive, said connection having clutch means to disconnect the said variable speed drive for direct elevation tracking, a constant speed motor for driving the constant speed discs of the two said variable speed drives, a fourth differential one of the input gears of which is connected to the output gear of the said third differential and the other of its input gears being connected to the said elevation tracker's handwheel, a drive connection between the output gear of the said fourth diffential and the said telescope shaft, means including an elevation variation cam for automatically varying the ball carriage of the said variational elevation variable speed device, a common shaft mounting the said azimuth variation cam and the said elevation variation cam, a constant speed motor connected to the said cam shaft, said connection including means for varying the speed of the cam shaft.

3. In a director trainer for use with a stationary, miniature aerial target, the combination of an azimuth tracker's handwheel, a fixed azimuth gear having a vertical axis, a variable speed device for introducing variational turning in said pinion, a variable speed device for supplying the rate change for azimuth rate tracking, a first differential one of the input gears of which is connected to the driven shaft of the said variational azimuth variable speed device and the other of its input gears being connected to the driven shaft of the said azimuth rate tracking variable speed drive, a drive connection between the said azimuth tracker's handwheel and the ball carriage of the said azimuth rate tracking variable speed drive, a second differential one of the input gears of which is connected to the output gear of the first said differential and the other of its input gears being connected to the said azimuth tracker's handwheel, a drive connection between the output gear of the second said differential and said pinion, means including an azimuth variation cam for automatically varying the ball carriage of the said variational azimuth variable speed device, a shaft, an azimuth tracker's and an elevation tracker's telescope mounted on the said shaft, an elevation tracker's handwheel, a variable speed device for introducing variational turning in the said telescope shaft, a variable speed device for supplying the rate for elevation rate tracking, a third differential one of the input gears of which is connected to the driven shaft of the said variational elevation variable speed device and the other of its input gears being connected to the driven shaft of the said elevation rate tracking variable speed drive, a drive connection between the said elevation tracker's handwheel and the ball carriage of the said elevation rate tracking variable speed drive, a fourth differential one of the input gears of which is connected to the output gear of the said third differential and the other of its input gears being connected to the said elevation tracker's handwheel, a drive connection between the output gear of the said fourth differential and the said telescope shaft, means including an elevation variation cam for automatically varying the ball carriage of the said variational elevation variable speed device, a common shaft mounting the said azimuth variation cam and the said elevation variation cam, a recording device comprising paper driving means connected to the said cam shaft, and a pair of stylus markers, one of the said stylus markers being connected to the said azimuth gear to record azimuth turning of the said azimuth telescope and the other of the said stylus markers being connected to the said telescope shaft to record elevation turning of the said elevation telescope.

4. In a director trainer for use with a stationary, miniature target, the combination of an azimuth tracker's and an elevation tracker's handwheel, a fixed azimuth gear having a vertical axis, a pinion meshing with and revoluble about said gear to rotate the device about said axis, a shaft, an azimuth tracker's telescope and an elevation tracker's telescope mounted on the said shaft, means under control of the said azimuth tracker's handwheel and the said elevation tracker's handwheel for turning, respectively, the said pinion and the said telescope shaft in aided tracking, the said means being conditionable for direct tracking, means including an azimuth cam and an elevation cam for turning said pinion and the said telescope shaft in opposition to the turning occasioned by the hand wheel according to a predetermined variation, means for turning the said cams at selected speeds to simulate target speed, and means for separately recording the turning of the said pinion and the said telescope shaft.

5. In a director trainer for use with a stationary, miniature target, the combination of an azimuth tracker's handwheel and an elevation tracker's handwheel, a fixed azimuth gear having a vertical axis, a pinion meshing with and revoluble about said gear to rotate the device about said axis, a shaft, an azimuth tracker's telescope and an elevation tracker's telescope mounted on said shaft, means under control of said azimuth tracker's handwheel and said elevation tracker's handwheel for turning, respectively, said pinion and said telescope shaft in aided tracking, said means being conditionable for direct tracking, means including an azimuth cam and an elevation cam for turning the said azimuth gear and the said telescope shaft in opposition to the turning occasioned by the hand wheel according to a predetermined variation, and means for turning the said cams at selected speeds to simulate target speed.

6. In a director trainer for use with a stationary, miniature target, the combination of an azimuth tracker's handwheel and an elevation tracker's handwheel, a fixed azimuth gear having a vertical axis and a pinion meshing with and revoluble about said gear to rotate the device about said axis, a shaft, an azimuth tracker's telescope and an elevation tracker's telescope mounted on said shaft, means under control of said azimuth tracker's handwheel and said elevation tracker's handwheel for turning, respectively, said pinion and said telescope shaft, means for turning said pinion and said telescope shaft in opposition to the turning occasioned by the handwheel according to a predetermined variation, and means for separately recording the turning of the said pinion and the said telescope shaft.

7. In a director trainer for use with a stationary, miniature target, the combination of an azimuth tracker's and an elevation tracker's handwheel, a fixed aximuth gear having a vertical axis, a pinion meshing with and revoluble about said gear to rotate the device about said axis, a shaft, an azimuth tracker's telescope and an elevation tracker's telescope mounted on said shaft, means under control of said azimuth tracker's handwheel and said elevation tracker's handwheel for turning, respectively, said pinion and said telescope shaft, and means for turning said pinion and the said telescope shaft in opposition to the turning occasioned by the handwheel according to a predetermined variation.

8. In a director trainer for use with a stationary, miniature target, the combination of an azimuth tracker's and an elevation tracker's handwheel, means for automatically imparting azimuth and elevation variations to the said trainer according to a predetermined schedule, means under control of the said handwheels for maintaining the trainer on the said stationary target in opposition to the said automatic variation imparted to the trainer, and means for separately recording the resultant turning as in azimuth and an elevation.

9. In a director trainer for use with a stationary, miniature target, the combination of an azimuth tracker's and an elevation tracker's handwheel, means for automatically imparting azimuth and elevation variations to the said trainer according to a predetermined schedule, means under control of the said handwheels for maintaining the trainer on the said stationary target in opposition to the said automatic variation imparted to the trainer.

10. In a trainer for simultaneously training azimuth and elevation gun trackers in the art of accurately tracking an aerial target, said trainer having parallel telescopes rotatable together in azimuth and in elevation, respective differential gear trains, an output driving connection between one leg of one said train and the trainer for traverse of the telescopes, a driving output connection between one leg of the other differential gear train and the trainer for elevational movement of the telescopes, respective dual input controls for the differential gear trains, each control being connected to a respective leg of the train other than the one leg first named; the combination therewith of two miniature targets mounted close to the trainer with their centers spaced apart a distance approximately the same as the distance between the objective axes of the telescopes and in a common vertical plane at equal distances from the axis of azimuth rotation of the trainer, whereby respective images will appear in the telescopes when brought to bear on the targets, which will be the same as the images of a single full size target which would appear in the telescopes when such target is viewed in the telescopes at normal gun ranges.

11. In a director trainer, a line of sight device angularly movable about an axis, a differential means, means including a movable cam element to impart predetermined speed variations to one side of said differential means, a manually controlled drive connected to operate a second side of said differential means, and means connecting a third side of said differential to effect angular movement of said sight device.

12. In a director trainer, a line of sight device angularly movable about an axis, a differential, a first variable speed drive having its output connected to operate a first side of said differential, movable cam means connected to said drive to effect a predetermined sequence of speed variations thereto and to said first differential side, a second variable speed drive having its output connected to a second side of said differential, manually-operable means to control the speed of said second variable speed drive and a connection operable to angularly move said line of sight device in response to movement of the third side of said differential.

13. In a training instrument, a sight device mounted for pivotal movement about an axis angularly related to a line of sight determined thereby, a first power-driven variable speed drive, a differential having first and second sides and a third side rotated proportional to the algebraic sum of the rotations of said first and second sides, said first side being rotated in response to the output of said first variable speed drive, manually operable means connected to vary the speed output of said first variable speed drive, second variable speed drive, said second side of said differential being rotated in response to the output of said second variable speed drive, cam means movable to automatically effect a predetermined sequence of adjustments of said second variable speed drive, and means pivoting said sight device in response to rotation of said third side of said differential.

14. In a training instrument, a sight, a differential, means connected to rotate a first side of said differential in a predetermined sequence of speeds, manually-controlled variable speed means connected to operate a second side of said differential and means moving said sight by and in accordance with the movement of the third side of said differential.

15. In a training device, first and second variable speed drives, manually operable means controlling said first drive, cam means automatically controlling said second drive, a sight, and means pivoting said sight in response to the algebraic sum of the output movements of said drives.

16. In a training device, a sight mounted for pivotal movement about an axis, first and second variable speed drives, first and second differentials, means connecting the output of said variable speed drives to actuate first and second sides, respectively of said first differential, a drive from the output of said first differential to the first side of said second differential, manually operable means connected to drive the second side of said second differential, a driving connection from the output of said second differential to said sight, cam-controlled means effective to automatically vary the speed output of said second variable speed drive through a predetermined sequence of speeds, and a disconnectable drive effective to vary the speed output of said first variable speed drive by and in response to actuation of said manually operable means.

17. In a gun fire director trainer, differential means, cam controlled means automatically effecting a predetermined sequence of speed variations of one side of said differential means, a sighting device connected to be angularly adjusted by the output of said differential means, and manually controlled variable speed means connected to actuate the second side of said differential means whereby said sighting device may be maintained directed upon a fixed target when the said first and second sides of said differential means are actuated at equal speeds.

RICHARD C. DARNELL.